United States Patent
Honey et al.

(10) Patent No.: US 11,203,071 B2
(45) Date of Patent: Dec. 21, 2021

(54) CORE DRILL GUIDE APPARATUS AND METHOD

(71) Applicants: Graham Richard Honey, Auckland (NZ); David John Honey, Auckland (NZ); Nathan Samuel Stronge, Sunnyhills Auckland (NZ)

(72) Inventors: Graham Richard Honey, Auckland (NZ); David John Honey, Auckland (NZ)

(73) Assignees: Graham Richard Honey, Auckland (NZ); David John Honey, Auckland (NZ); Nathan Samuel Stronge, Auckland (NZ)

( * ) Notice: Subject to any disclaimer, the term of this patent is extended or adjusted under 35 U.S.C. 154(b) by 0 days.

(21) Appl. No.: 16/612,024

(22) PCT Filed: May 10, 2018

(86) PCT No.: PCT/NZ2018/050064
§ 371 (c)(1),
(2) Date: Nov. 8, 2019

(87) PCT Pub. No.: WO2018/208175
PCT Pub. Date: Nov. 15, 2018

(65) Prior Publication Data
US 2020/0122242 A1    Apr. 23, 2020

(30) Foreign Application Priority Data
May 10, 2017 (NZ) .......................... 731758

(51) Int. Cl.
  *B23B 47/28*   (2006.01)
  *B23B 51/04*   (2006.01)
  *B23B 49/02*   (2006.01)

(52) U.S. Cl.
  CPC .......... *B23B 47/287* (2013.01); *B23B 49/026* (2013.01); *B23B 51/0406* (2013.01); *B23B 2251/428* (2013.01)

(58) Field of Classification Search
  CPC ..... B23B 49/02; B23B 49/026; B23B 47/287; B23B 47/28; B23B 2247/00;
  (Continued)

(56) References Cited

U.S. PATENT DOCUMENTS 5,143,489 A * 9/1992 Bogner ................... B23B 49/02
                                                    408/1 R
5,267,833 A    12/1993 Mouille
(Continued)

FOREIGN PATENT DOCUMENTS

| CA | 2646812 C | 9/2016 |
| GB | 676472 A | 7/1952 |
| GB | 2535803 A | 8/2016 |

OTHER PUBLICATIONS

International Search Report, dated Oct. 24, 2019, from corresponding PCT application No. PCT/NZ2018/050064.

*Primary Examiner* — Eric A. Gates
*Assistant Examiner* — Chwen-Wei Su
(74) *Attorney, Agent, or Firm* — Nixon & Vanderhye

(57) ABSTRACT

Disclosed is a core drill guide apparatus for providing a guide for a core drill apparatus to drill into a substrate to form a removable core. The apparatus includes an elongate body with an outer surface and inner space, having an entrance end, an exit end and side walls, a distance between the ends defining a length or height of the elongate body and a width. An passageway extends through the elongate body from entrance to exit end, adapted so that in use, it provides sliding receipt of a fastening system to clamp the apparatus to an outer surface surrounding a first hole in a substrate, allowing the apparatus to abut the outer surface and drill out (Continued)

a core in the substrate underneath and surrounding the first hole. A corresponding guide method and fastening system are also disclosed.

9 Claims, 11 Drawing Sheets

(58) Field of Classification Search
CPC .............. B23B 51/0406; B23B 51/044; B23B 2251/428; B28D 1/041; B28D 1/146
USPC ................................. 175/403, 404; 125/120
See application file for complete search history.

(56) References Cited

U.S. PATENT DOCUMENTS

| | | | | |
|---|---|---|---|---|
| 5,366,326 | A * | 11/1994 | Converse | ................ B23B 49/02 |
| | | | | 408/204 |
| 5,711,506 | A | 1/1998 | Stillwagon | |
| 8,137,036 | B2 * | 3/2012 | Wadley | ................ B23B 49/026 |
| | | | | 408/1 R |
| 8,657,037 | B2 * | 2/2014 | Noiman | ................ B23B 51/044 |
| | | | | 175/249 |
| 10,493,537 | B2 * | 12/2019 | Sirch | ....................... B23B 45/06 |
| 2016/0273235 | A1 * | 9/2016 | Davidian | ............ B23B 51/0426 |
| 2016/0279716 | A1 * | 9/2016 | Gamboa Arias | .... B23B 51/0426 |

\* cited by examiner

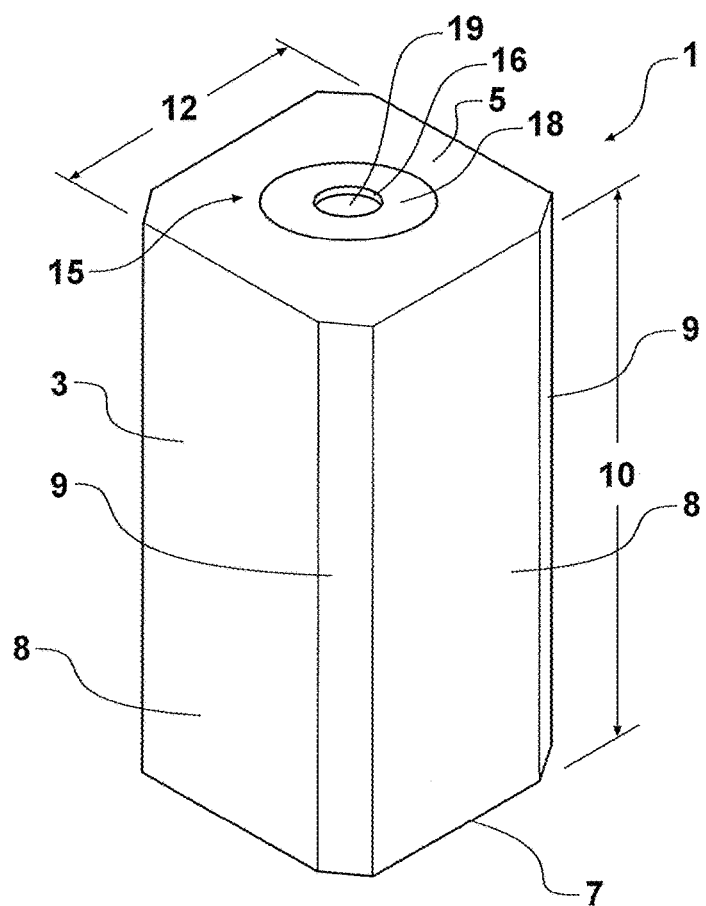
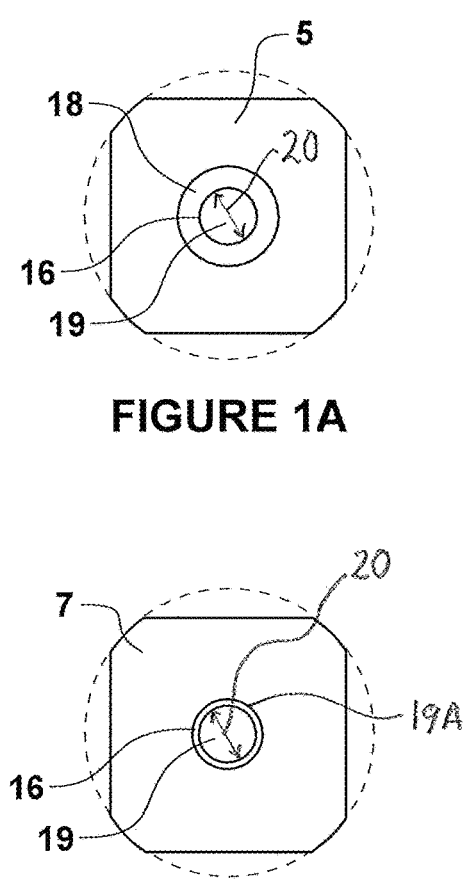
FIGURE 1
FIGURE 1A
FIGURE 1B
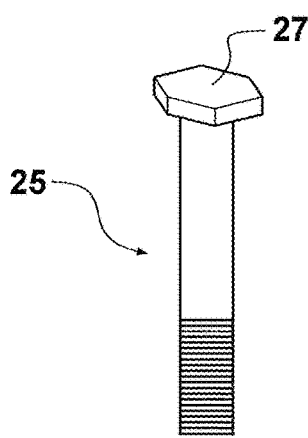
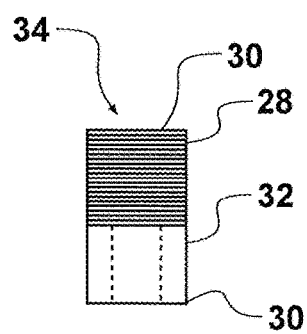
FIGURE 2
FIGURE 3

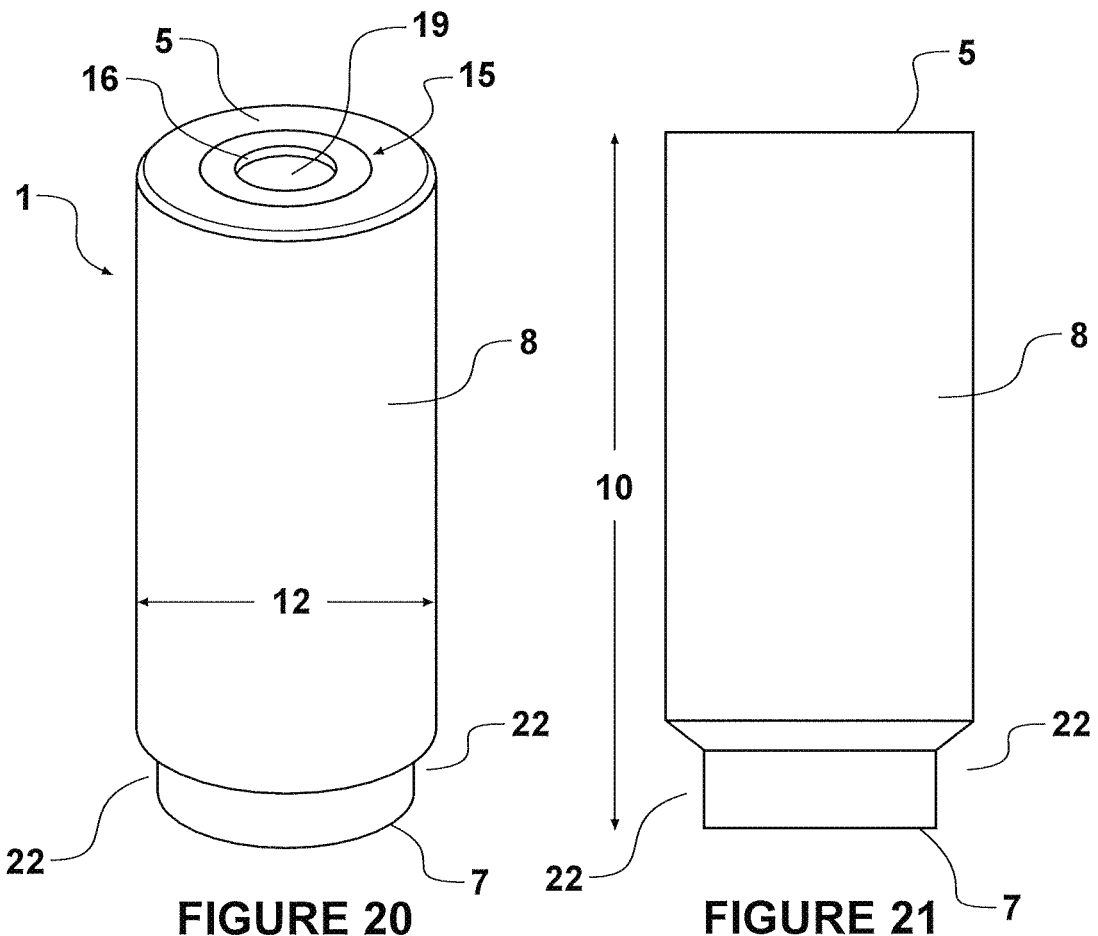
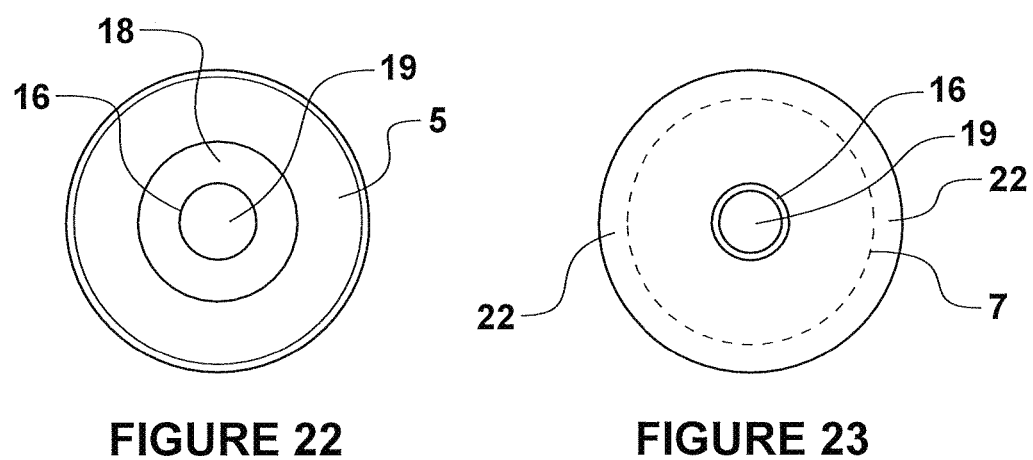

CORE DRILL GUIDE APPARATUS AND METHOD

The invention relates to a core drill guide apparatus for guiding a core drilling apparatus to drill into a substrate to produce a core and to a method of operation. The invention is directed particularly but not solely towards core drilling guide apparatus has a shape or configuration that is capable of or enables the core drill guide apparatus when in use, to guide a core drill when drilling or not and/or provide means for the core drill guide apparatus when in use, to be able to be fixed or removably fixed to a substrate being drilled into.

BACKGROUND OF INVENTION

Existing methods of drilling cores mainly rely on the accuracy and skill of the operator which is not a good result for the operator or the client. Problems occur due to sloppy work practices and no training which leads to unsafe work practices such as caused by clothing including trousers, feet and shoe entanglement which can cause unnecessary injury or even death.

The client can be left with poor core positioning, poor angle of orientation, and generally poor quality of work. Existing methods are makeshift and include attempting to use a tube which can block the view of the operator as to the proper location of the core. Other methods include using ones feet to steady the core drill or using a board of ply held down by the operator's feet which again can block the precise location of core or hole and can be dangerous trying to drill and hold down the board at the same time.

Yet other methods also use complicated pieces of machinery which forces the use of at least two people and temporary fixings into a floor which must be patched afterwards. This type of machinery is not able to be easily used with a wall. Therefore any machinery can be costly to purchase, costly to operate and store with limited use.

Other problems include the difficulty in removing the core after drilling which commonly includes attempts to wedge in a lever, to lever out the core. Levering is an awkward action to do which can be dangerous and time consuming, and even damage the surrounding drilled hole.

Furthermore because of the sloppy work practices combined with the difficulty in keeping a core drill in a correct position, it means that the drilling takes longer than it should.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is an object of the invention to provide an improved core drill guide apparatus and method of operation that ameliorates some of the disadvantages and limitations of the known art or at least provide the public with a useful choice.

SUMMARY OF INVENTION

Accordingly in one aspect the invention consists in a core drill guide apparatus 1 for providing a guide for a core drill apparatus to drill into a substrate 13 to form a removable, core 11, wherein the core drill guide apparatus includes an elongate body which includes an outer surface 3 and inner space, having one end 5, another end 7 and side walls 8, a distance between the ends 5, 7 defining a length or height 10 of the elongate body and a width 12 is defined as the distance at right angles to the length, between the side walls 8 wherein one end 5 can be termed the entrance end 5 and other end 7 can be called the exit end 7, wherein an inner passageway 19A in the elongate body is provided extending from the entrance end 5 to the exit end 7 which is adapted when in use, to provide sliding receipt of a fastening system there through to clamp the core drill guide apparatus 1 to an outer surface 48 surrounding a first hole 38 in a substrate 13, to then allow a core drill apparatus 36 to abut thereon to outer surface 48 and drill out a removable, core 11 in the substrate 13 underneath and surrounding the first hole 38.

Preferably an elongate insert member 15 is located in the inner passageway 19A of the elongate body which extends substantially from one end 5 to the exit end 7 of the elongate body, the fastening system includes an anchor bolt 25 and anchor stud 28, wherein the elongate insert member 15 includes a cylindrical body portion 16 and at least one end cap portion 18 and the cylindrical body portion 16 provides a hollow passageway 19 of a diameter 20 such that the end cap portion 18 provides abutting strength for a head of the fastening system to clamp there against and a body of the anchor bolt 25 of the fastening system to be slidably located in the hollow passageway 19.

Preferably, the side walls 8 between the entrance end 5 and exit end 7 are planar thereby providing a continuous surface in a 'block shape' shape.

Alternatively, the side walls 8 between the entrance end 5 and exit end 7 are recessed thereby providing a 'cable reel' shape.

Preferably the elongate body is shaped having side walls 8 bordered by corners 9.

Preferably, the elongate body of the core drill guide apparatus 1 is formed of substantially plastics material.

Preferably, the elongate insert member 15 is a formed of a suitable metal which is friction fitted to the elongate body of the core drill guide apparatus 1.

Preferably the elongate insert member 15 is centrally located in the elongate body of the core drill guide apparatus 1.

Preferably the elongate body is formed of a polygonal shape having corners 9 shaped as arcs as part of an imaginary circle peripherally joining all corners.

Alternatively the elongate body is formed of curved shape being cylindrical.

Alternatively the elongate body is formed of a polygonal shape having corners 9 shaped as vertical planar surfaces.

Preferably at least a portion of each corner located at, at least one end of the elongate body is formed as a notch 22 stepped inwardly from the rest of the corner 9 thereby facilitating the drilling there around by a core drill apparatus without interfering with the elongate body wherein each notch is located at the exit end 7 distal to the entrance end 6.

Preferably at least a portion of the exit end 7 of the elongate body includes is formed including a notch 22 stepped inwardly from the rest of the outer surface 3 thereby facilitating the drilling there around by a core drill apparatus without interfering with the elongate body.

Preferably at least one notch 22 is provided on corner 9.

Alternatively, at least two notches 22 are provided peripherally spaced around an outer surface of the elongate body wherein the notches are located at the exit end 7 distal to the entrance end 6.

Accordingly in one aspect the invention consists in a method of guiding a core drill apparatus 36 by operating a core drill guide apparatus 1 and a fastening system for providing a guide to a core drill apparatus 36 to drill into a substrate 13 to produce a removable, core 11, wherein the core drill guide apparatus includes an elongate body with an inner passageway 19A or hollow passageway 19 which includes an outer surface 3 and inner space, having one end 5, other end 7 and side walls 8 bordered by corners 9, a distance between the ends 5, 7 defines a length or height 10 of the body and a width 12 is defined as the distance at right angles to the length, between the side walls 8 wherein one end 5 can be termed the entrance end 5 and the other end 7 can be called the exit end 7, wherein the inner passageway 19A or hollow passageway 19 is adapted to provide sliding receipt of a fastening system there through to clamp the core drill guide apparatus 1 to an outer surface 48 surrounding the first hole 38, wherein the fastening system includes an anchor bolt 25 and an anchor stud 28 having a body with ends 30 and sides 32 with a threaded central hole 34 and the anchor bolt 25 has a driving end presenting an upper drive surface 27, wherein the method includes the following steps of:

1. Drill a first hole 38 using a standard drilling apparatus of a suitable diameter 40, depth 42 and orientation or angle of repose 44, into a substrate 13. Clear away any drilled waste from the first hole 38 leaving an empty hole—See FIGS. 4 and 5;
2. Slidably insert an anchor stud 28 into the first hole 38 by hammering into place with a top end 30 to be flush with the outer surface 48 of the substrate 13—See FIGS. 6 and 7 which provides an anchor pathway with an internal thread;
3. Place the core drill guide apparatus 1 with exit end 7 abutting outer surface 48 of the substrate 13 surrounding the first hole 38 by aligning the inner passageway 19A or hollow passageway 19 with the anchor pathway of first hole 38—See FIGS. 8 and 9;
4. Push the anchor bolt 25 through the inner passageway 19A of elongate body of the core drill guide apparatus 1 or the hollow passageway 19 of the elongate insert member 15 of the core drill guide apparatus 1 and threadingly down into the anchor pathway of anchor stud 28 to abut and clamp the core drill guide apparatus 1 to the outer surface 48 of the substrate 13 surrounding the first hole 38—see FIGS. 10 and 11;
5. Then place a selected core drill apparatus 36 with its inner passageway 62 first sliding clear but being guided over the exit end 7 of (also is over elongate insert member 15) and outer surface 3 of the elongate body of core drill guide apparatus 1 whereby an end 56 of the core drill apparatus 36 peripherally abuts the outer surface 48 of the substrate 13—see FIGS. 12 and 13;
6. Then drill the core drill apparatus 36 downwardly forming a second hole 70 of a suitable dimeter 50 at a certain depth 52 while still being guided by an outer surface 3 of the elongate body of the core drill guide apparatus 1.

Preferably further steps can include:

1. Then continue core drilling to have the inner end stop surface 64 of core drill apparatus 36 abut the driving end surface 27 of anchor bolt 25 for holding the core drill guide apparatus 1 in place—see FIG. 14;
2. Then remove the core drill apparatus 36 from the second hole 70 and over the cylindrical elongate body 15 of the core drill guide apparatus 1;
3. Then remove the anchor bolt 25 by unscrewing manually or mechanically leaving the anchor stud 28 in the first hole 38 of diameter 40;
4. Next if required, finish drilling around the anchor stud 28, by re-using the core drill apparatus 36 by placing it in the cored hole 70 (core 11 still in place) and continue drilling to a desired depth;
5. Finally remove the core drill apparatus 36 and re-screw in the anchor bolt 25 into the anchor stud 28 and using the anchor bolt 25 to pull out both the anchor bolt 25 and anchor stud 28 with a cored substrate material 11, leaving an empty cored second hole 70 see FIG. 15;
6. Alternatively, after finishing drilling, one can leave the core drill guide apparatus 1 in place and then reattach the anchor bolt 25 and remove ie lift out the core 11 with the core drill guide apparatus 1 attached.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION

The invention will now be described, by way of example only, by reference to the accompanying drawings:

FIG. 1 is a schematic perspective upper view of the core drill guide apparatus in accordance with a first preferred embodiment of the invention.

FIG. 1A is a top end section of the core drill guide apparatus as in FIG. 1 showing how the corners are formed as an arc derived from an outer circle.

FIG. 1B is a bottom end section of the core drill guide apparatus as in FIG. 1 showing how the corners are formed as an arc derived from an outer circle.

FIG. 2 is a schematic perspective of an anchor bolt used with the core drill guide apparatus.

FIG. 3 is a schematic perspective side view of a split sleeve/anchor stud with an internal thread therein, being used with the anchor bolt of FIG. 3.

FIG. 4 is a schematic side view of the first step in accordance with a method of installation for a horizontal substrate such as a concrete floor.

FIG. 5 is a schematic side view of the first step in accordance with the method of installation for a vertical substrate such as a wall.

FIG. 6 is a schematic side view of step 2 in relation to preparing to insert the anchor stud.

FIG. 7 is a schematic side view of step 2 in relation to having the anchor stud in place.

FIG. 8 is a schematic side view of step 3 whereby the core drill guide apparatus is placed over the anchor stud for a floor.

FIG. 9 is a schematic side view of step 3 similar to FIG. 8 but with a wall.

FIG. 10 is a schematic side view of step 4 whereby an anchor bolt of FIG. 2 is pushed through the core drill guide apparatus eg a block and into the anchor stud to secure the core drill guide apparatus to the floor or wall.

FIG. 11 is a schematic side view of step 4 whereby the anchor bolt is screwed in place.

FIG. 12 is a schematic side view of step 5 where a core drill apparatus is ready to be used for a floor drilling.

FIG. 13 is a schematic side view of step 5 where the core drill apparatus is placed over the core drill guide apparatus ready to drill into a floor.

FIG. 14 is a schematic side view of step 6 where a core drill apparatus is drilled into the floor.

FIG. 15 is a schematic side view of step 10 where a core drill apparatus is first removed, then the core drill guide apparatus 1 is removed, and then separately, the core substrate material is removed using the anchor fastener after the drilling is finished.

FIG. 15A is a schematic side view of step 10 of another option where a core drill apparatus is first removed and then the core substrate material with the core drill guide apparatus are removed together, after the drilling is finished.

FIG. 16 is a perspective view of another variation of the core drill guide apparatus—triangular.

FIG. 17 is a top plan view of the core drill guide apparatus of FIG. 16

FIG. 18 is a side view

FIG. 19 is a bottom plan view

FIG. 20 is a perspective view of another variation of the core drill guide apparatus—circular.

FIG. 21 is a top plan view of the core drill guide apparatus of FIG. 20

FIG. 22 is a bottom plan view

FIG. 23 is a side view

FIG. 24 is an upper perspective view of the core drill apparatus

FIGS. 25A-25C and FIGS. 26A, 26B are upper perspective views of the apparatus of the present invention in another variation, without the insert member or notches.

FIG. 27 is perspective view of the present invention showing yet another variation where the body shape is reduced in size leaving ends and a narrowed recess portion in between.

DESCRIPTION OF DRAWINGS

The following description will describe the invention in relation to preferred embodiments of the invention, namely a core drill guide apparatus 1 and a method of operation. The invention is in no way limited to these preferred embodiments as they are purely to exemplify the invention only and that possible variations and modifications would be readily apparent without departing from the scope of the invention.

As shown in FIGS. 1-27 the core drill guide apparatus 1 includes an elongate shaped body with an outer surface 3 and inner space. The elongate body includes one end 5, other end 7 and side walls 8. The side walls 8 extend from and including the one end 5 to and including the other end 7.

Figure 4:
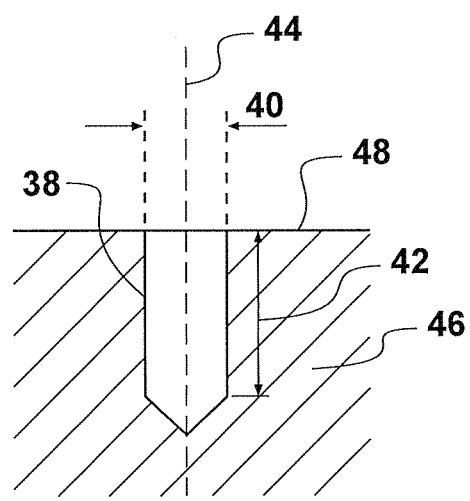
Figure 5:
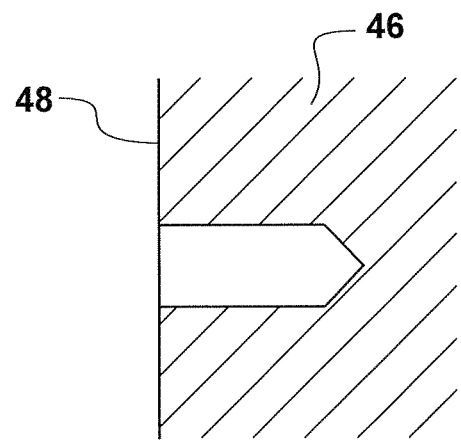
Figure 6:
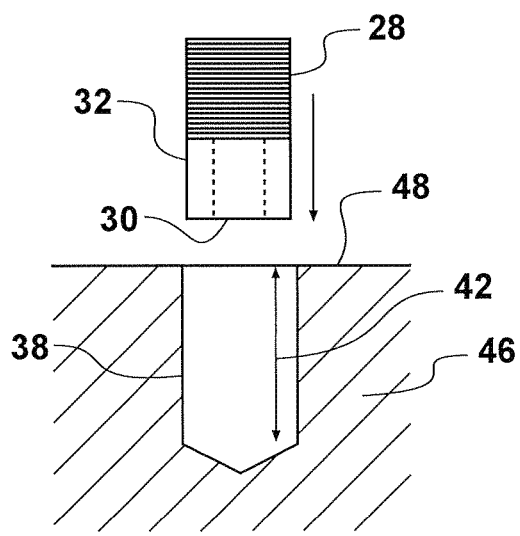
Figure 7:
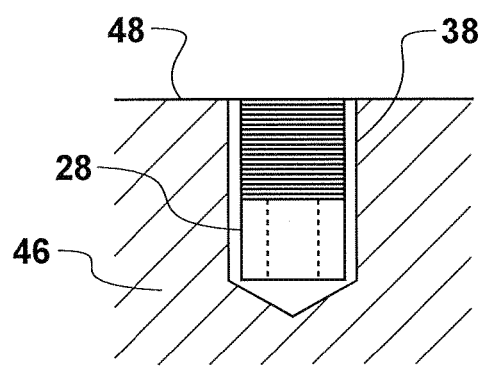
Figure 8:
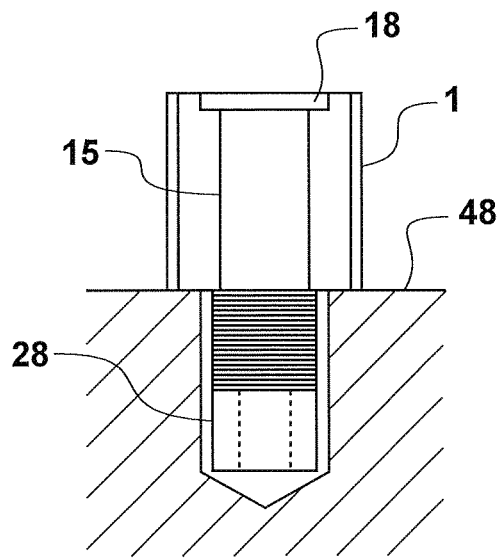
Figure 9:
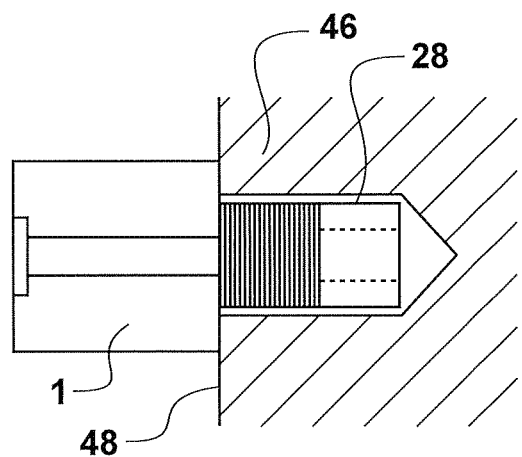
Figure 10:
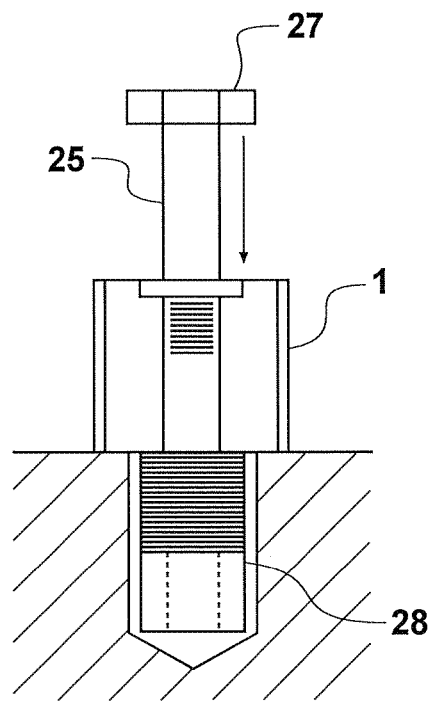
Figure 11:
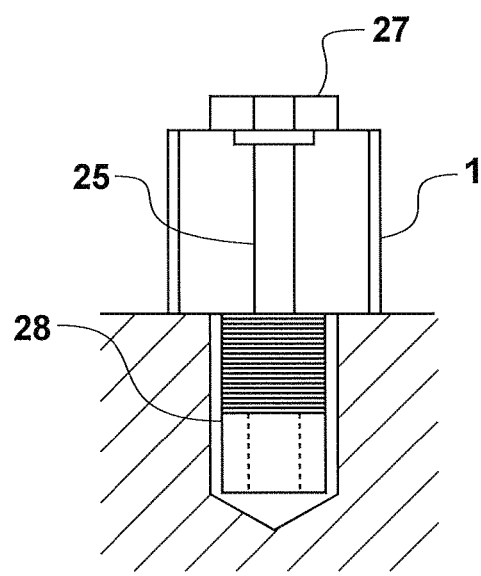
Figure 12:
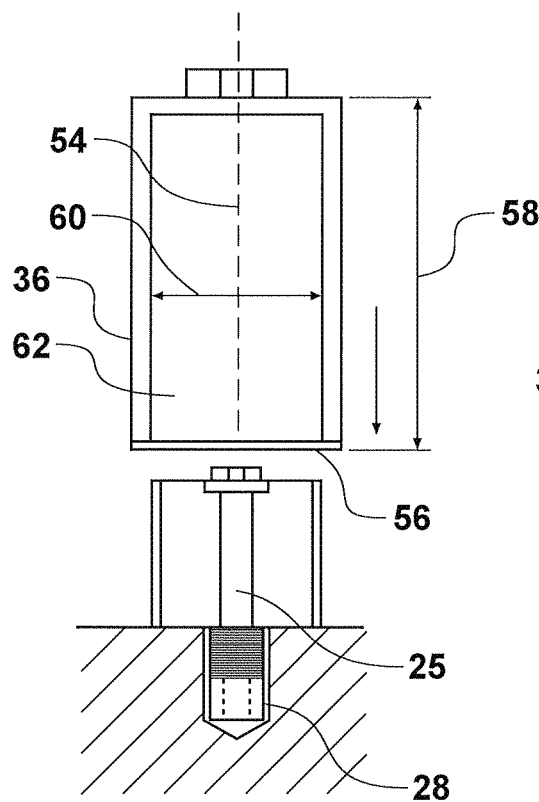
Figure 13:
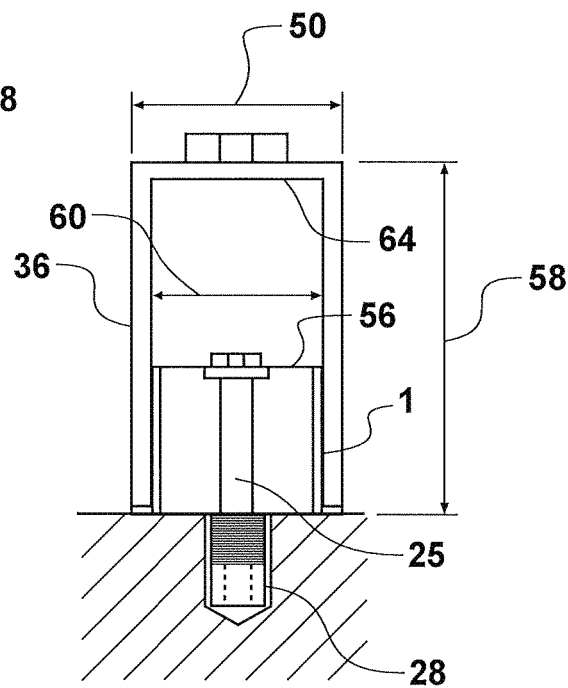
Figure 14:
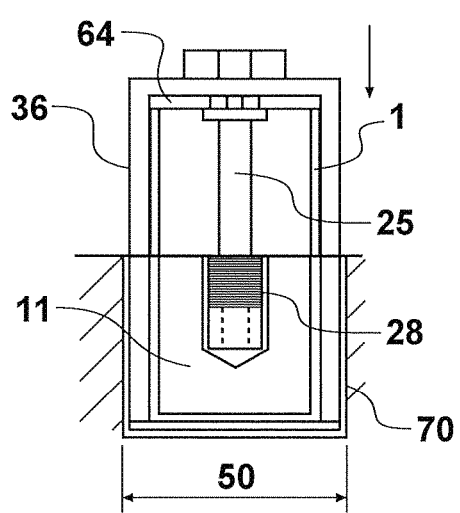

The core drilling guide apparatus has a shape or configuration that is capable of or enables the apparatus 1 when in use, to guide a core drill when drilling or not and/or provide means for the core drill guide apparatus 1 to be able to be fixed or removably fixed (eg a fastener or fastening system) to a substrate being drilled into.

A distance between the ends 5, 7 defines a length or height 10 of the body and a width 12 is defined as the distance at right angles to the length, between the side walls 8. One end 5 can be termed the entrance end 5 and the other end 7 can be called the exit end 7 which is distal with respect to the entrance end. The sides walls 8 extend from and between the ends 5, 7. The core drill guide apparatus 1 of the present invention is designed to be used as a guide for use with a core drill apparatus for drilling and facilitating the removal of a core substrate material 11 from a substrate 13.

The outer shape of the elongate body can be any suitable shape that includes the ends 5 and 7 with the inner space at least providing a passageway there between. The side walls 8 can be any suitable shape or extent at and between ends 5, 7. For example, if the side walls 8 are planar and substantially continuous in one plane ie for the sides walls 8 of the ends 5, 7 and of the rest of the elongate body in between, then the overall shape of the elongate body can be polygon shaped bordered by corners 9, or 'non-polygon' shaped ie be curved in its outer shape or if the sides are not planar or continuous, the other shapes can include for example a recess.

The inner space includes an inner passageway 19A extending from the one end 5 to the other end 7, and at least one elongate insert member 15 being located therein the inner passageway 19A. In this example an elongate insert member 15 is formed as a cylindrical elongate member, block or portion which is in this option, be centrally located in the inner passageway 19A of the elongate body and extends from one end 5 to the exit end 7. Elongate insert member 15 includes a cylindrical body portion 16 and at least one end cap portion 18 which are both exposed or seen at each end. The cylindrical body portion 16 provides a hollow passageway 19 of a diameter 20. The body portion 16 extends most of the complete length 10 except for or including the end cap portion 18 which is located at least, at one end such as the entrance end 5. The elongate insert member 15 with or without an end cap portion 18, assists in providing some strength or bearing surface to the elongate body or to at least the ends 5 or 7 of the elongate body.

In this example, the body of the elongate body of the core drill guide apparatus 1 is shaped in cross section as a square with corners 9 between the side walls 8. In this example the corners 9 are shown as be angled ie curved in a shallow arc derived as part of, from an imaginary outer circle as shown by the dotted lines in FIGS. 1A, 1B, 17 and 19 which peripherally joins the edge of all corners. The inner space between an outside of the elongate body to the outer surface 3, is formed of a substantially solid material. Alternatively the corners 9 of the elongate body can be shaped as flat vertical planar surfaces.

At least a portion of each corner 9 located at, at least one end of the elongate body is formed comprising at least one notch 22 stepped inwardly from the rest of the corner 9 thereby facilitating the drilling there around by a core drill apparatus 36 without interfering with or cutting/drilling into the elongate body of the core drill guide apparatus. Each notch 22 is located at or near the exit end 7 distal to the entrance end 6. Alternatively, each notch 22 is spaced and located peripherally at or near exit end 7 on an outer surface 3 of the elongate body 15.

In this example, the elongate body of the core drill guide apparatus 1 is formed as a block of plastics material. The elongate insert member 15 is a formed of a suitable metal which is friction fitted inside of the elongate body of the core drill guide apparatus 1. For example, the metal can be stainless steel.

The core drill guide apparatus 1 of the present invention is shaped and adapted to be fastened by a fastener system or assembly to the substrate 13, which in this example can include an anchor bolt 25 (eg M12) and an anchor stud 28 eg an expansion cylindrical split sleeve or anchor stud 28 having a body with ends 30 and sides 32 with an inner anchor pathway with an inner threaded central hole 34. Anchor bolt 25 has a driving end presenting an upper drive surface 27. The anchor bolt 25 functions to clamp against end cap portion 18 of the top end or entrance end 5 of the elongate body to push the elongate body of the core drill guide apparatus 1 against part of the outer surface 48 of the substrate 13 surrounding the first hole 38.

A core drill apparatus 36 (being formed with means to rotate an outer sleeve with an inner clear space therein) is typically used to drill a core there between when combined or used with the core drill guide apparatus 1 of the present invention. As shown in FIGS. 4-7 standard drilling apparatus is used to drill a first hole 38 (non-cored) of a certain diameter 40, depth 42 and orientation 44 into the-substrate 13 having an outer surface 48.

After drilling first hole 38, the anchor stud 28 is push fitted into first hole 38. Then as shown in FIGS. 8-11 the core drill guide apparatus is fitted and abutting the substrate 13 being centrally located thereon with the inner passageway 19 A and/or hollow passageway 19 being aligned with the first hole 38, to form a continuous pathway space and then fastened using anchor bolt 25 through the inner passageway 19A or hollow passageway 19 of the elongate body and into the anchor pathway of anchor stud 28 to be end, threadably engaged in the inner thread of the anchor stud 28. The threading action functions to expand the anchor stud 28 within first hole 38 to cause the anchor stud 28 to clamp, hold and locate to an inside of the first hole 38 of the substrate 13 and also to hold whatever is being clamped by the anchor bolt eg the elongate body of the core drill guide apparatus, to the substrate.

As shown in FIGS. 12-15, the core drill apparatus 36 is then used to drill a second hole 70 having a suitable dimeter 50 (of a larger diameter than the first hole 38), at a certain depth 52 (at least equal to or larger than the depth of the first hole 38) at a suitable angle 54 into the substrate 46 being any angle such for example horizontal like for example, a floor or vertically for a wall, made of concrete. The core drill apparatus 36 includes a drilling member having an end 56, a length 58, inner dimeter 60 and inner passageway 62. Within passageway 62 distal to an entrance end, there is an inner end stop surface 64. The core drill apparatus 36 drills or cores to form the second hole 70 by first forming the removable, core substrate material 11 which is later removed from the second hole 70 leaving an empty second hole 70.

One method of operation of the core drill guide apparatus 1, with a fastening system or assembly including an anchor bolt 25 and anchor stud 28, a core drill apparatus 36 whereby a core drill apparatus forms a first hole 38 and the core drill apparatus 36 forms a second hole 70 being a cored hole, by carrying out the following steps of:

1. Drill a first hole 38 using a standard drilling apparatus of a suitable diameter 40, depth 42 and orientation or angle of repose 44, into a substrate 13. Clear away any drilled waste from the first hole 38 leaving an empty hole—See FIGS. 4 and 5;
2. Slidably insert an anchor stud 28 into the first hole 38 by hammering into place with a top end 30 to be flush with the outer surface 48 of the substrate 13—See FIGS. 6 and 7;
3. Place the core drill guide apparatus 1 with exit end 7 abutting outer surface 48 of the substrate 13 surrounding the first hole 38 by aligning the inner passageway 19A or hollow passageway 19 with the anchor pathway of the anchor stud 28—See FIGS. 8 and 9;
4. Push the anchor bolt 25 through the inner passageway 19A of the elongate body of the core drill guide apparatus 1 or hollow passageway 19 of the elongate insert member 15 of the core drill guide apparatus 1 and threadingly down into the anchor pathway and thread of anchor stud 28 to clamp (by expanding the anchor stud 28 against the sides of the anchor hole 38) the core drill guide apparatus 1 to the outer surface 48 of the substrate 13 surrounding the first hole 38—see FIGS. 10 and 11;
5. Then place a selected core drill apparatus 36 with its inner passageway 62 first sliding clear but being guided over the exit end 7 of (also is over elongate insert member 15) and outer surface 3 of the elongate body of core drill guide apparatus 1 whereby an end 56 of the core drill apparatus 36 peripherally abuts the outer surface 48 of the substrate 13—see FIGS. 12 and 13;
6. Then drill the core drill apparatus 36 downwardly forming a second hole 70 (a cored hole) while still being guided by an outer surface 3 of the elongate body of the core drill guide apparatus 1 to a depth governed by the length of the core drill guide apparatus but being a greater diameter and depth than the diameter and depth of first hole 38.

Figure 15:
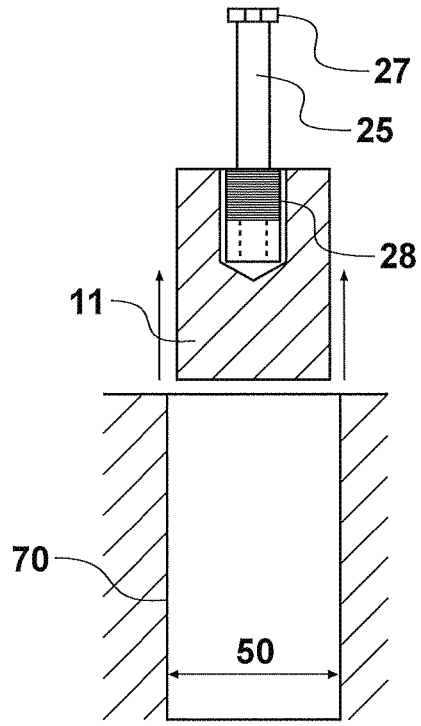
Figure 15A:
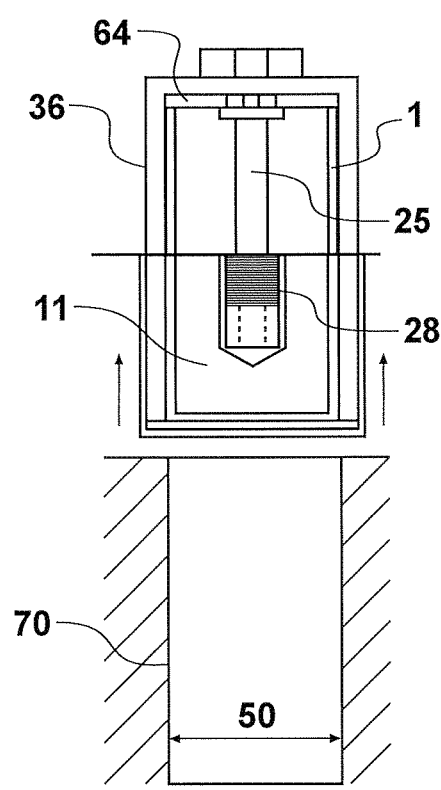
Figure 16:
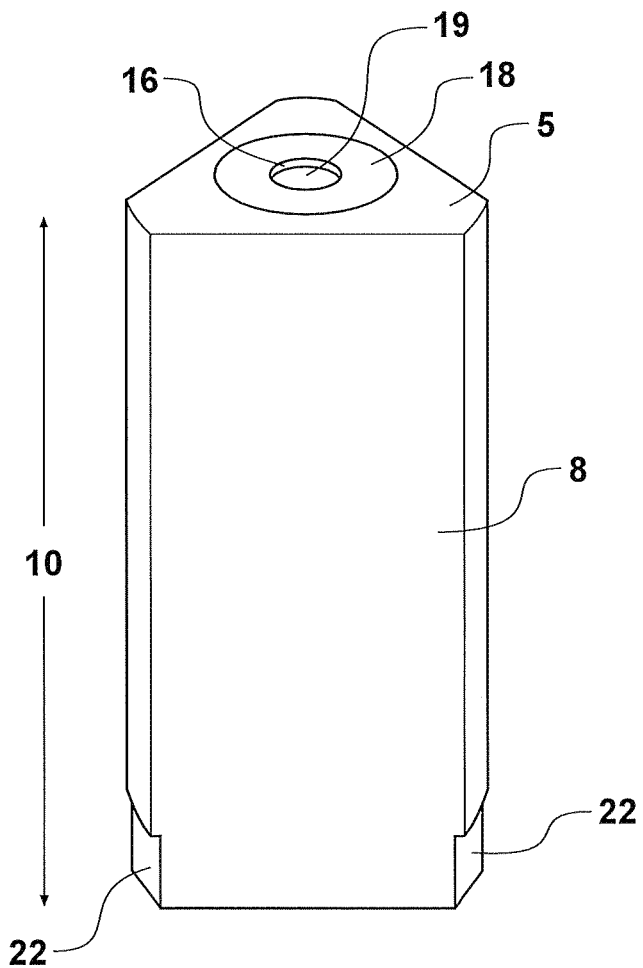
Figure 17:
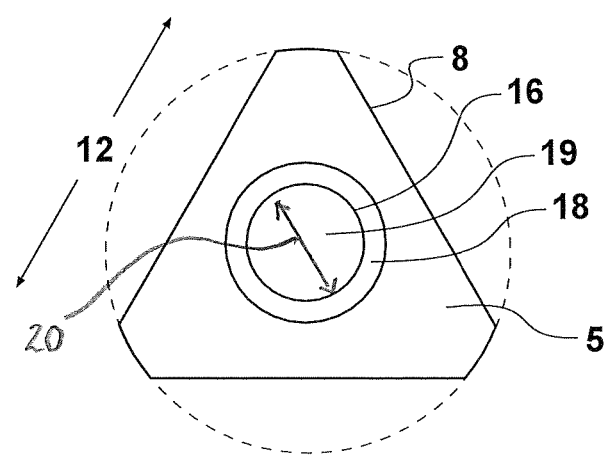
Figure 18:
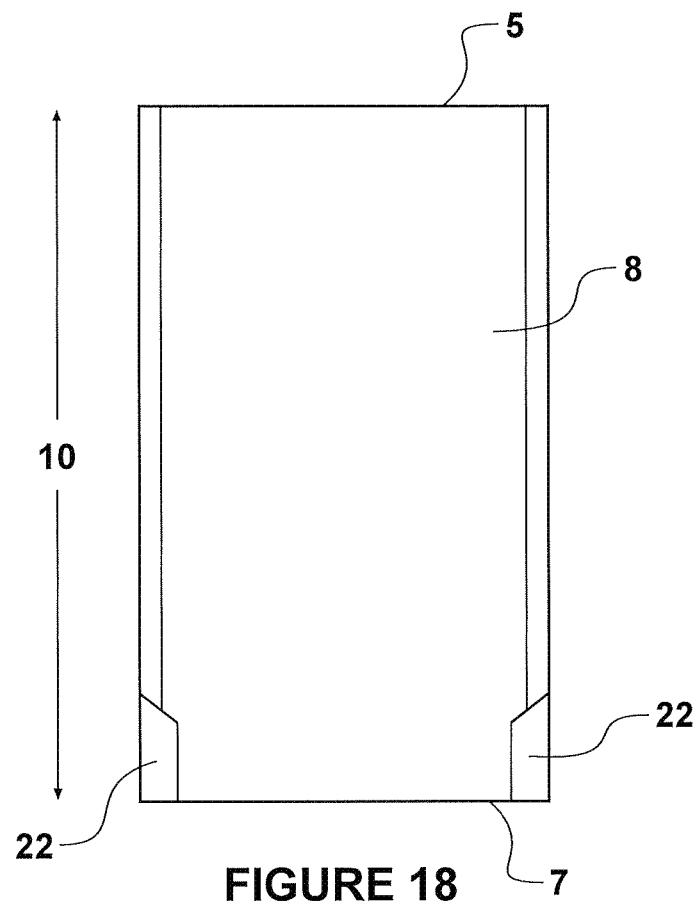
Figure 19:
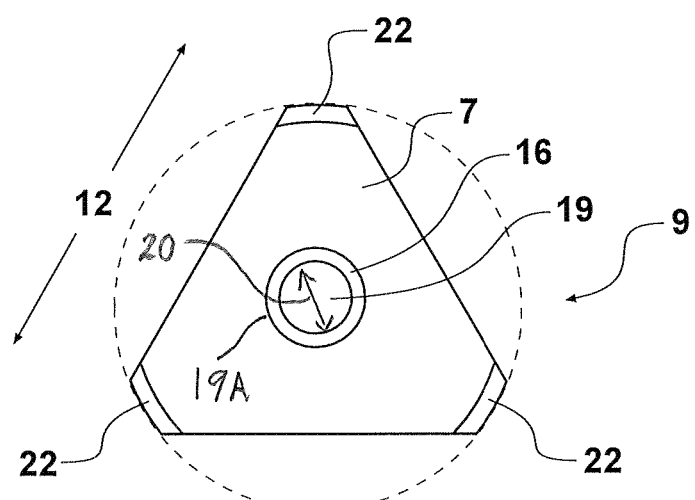
Figure 24:
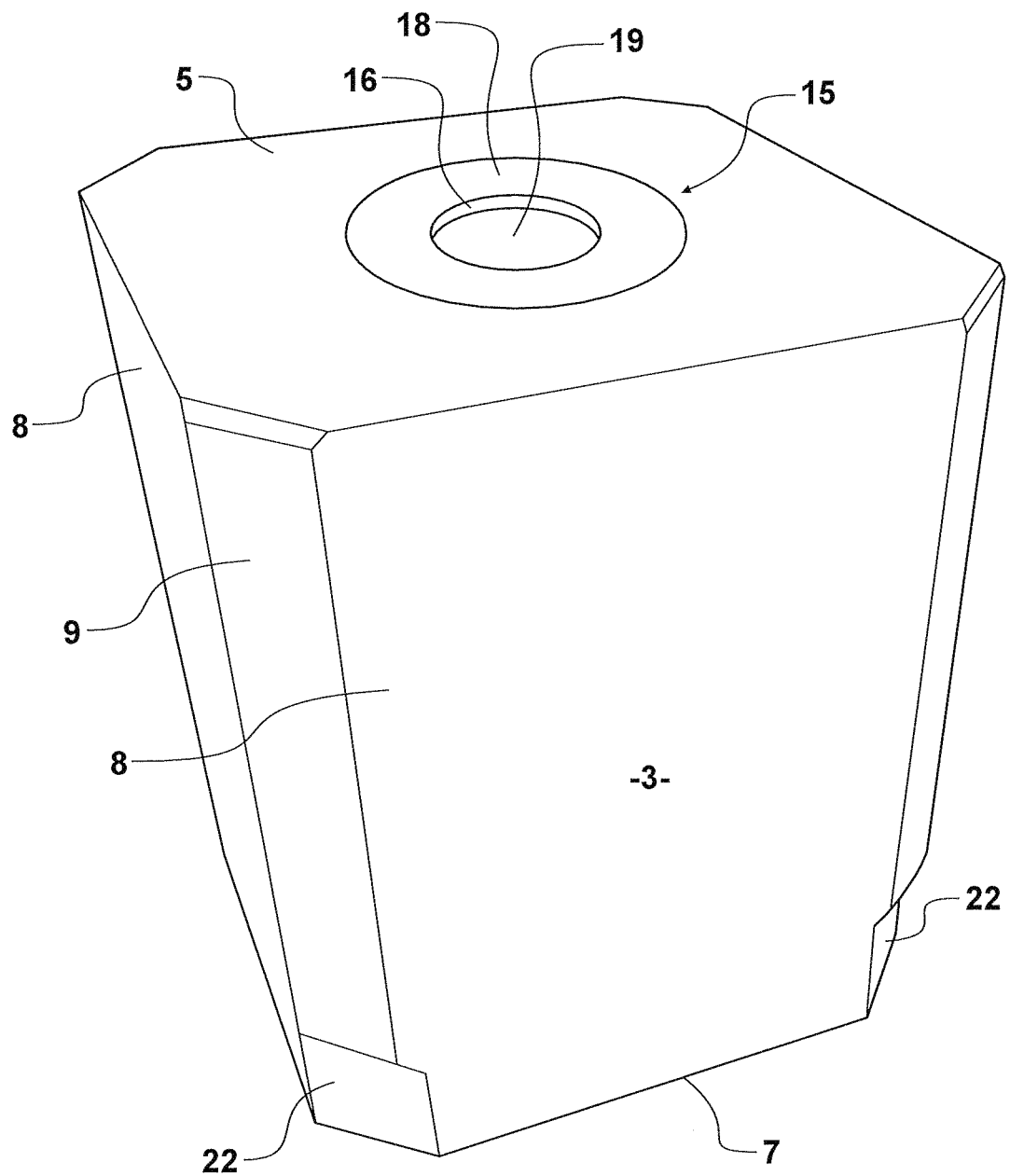
Figure 25A:
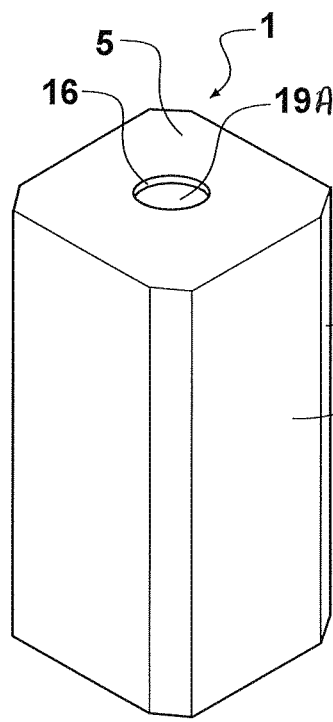
Figure 25B:
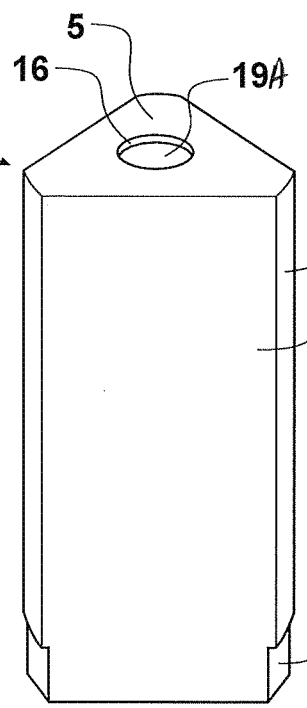
Figure 25C:
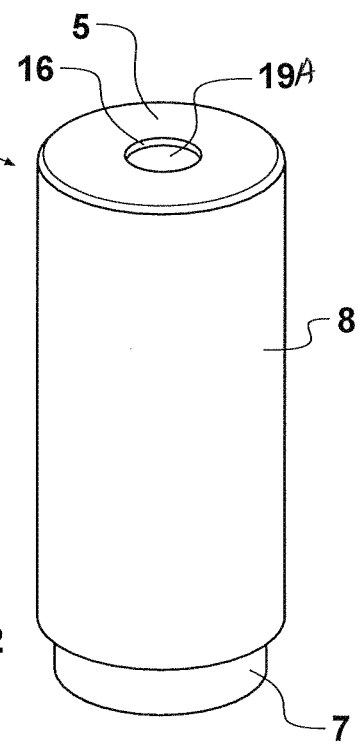
Figure 26A:
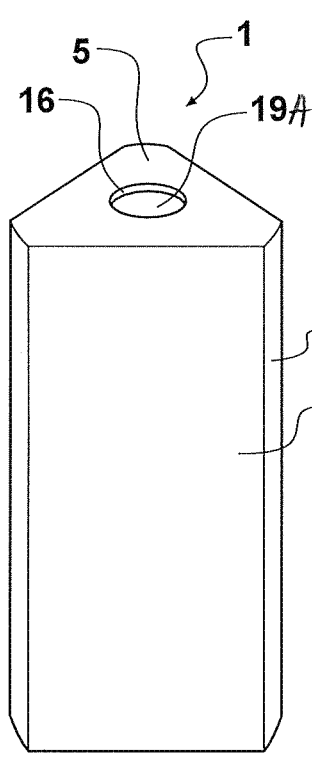
Figure 26B:
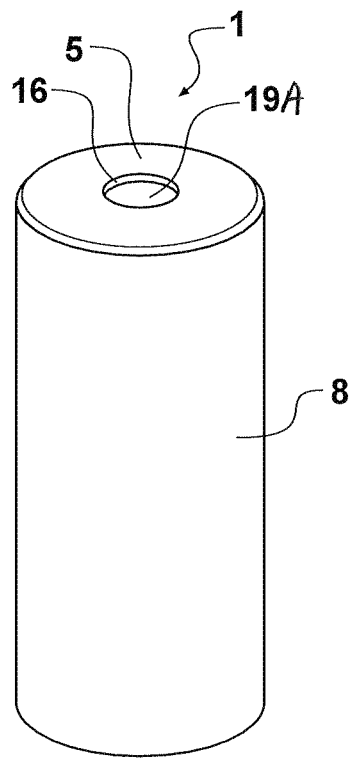

Further steps can also include:

1. Then if a deeper cored hole 70 is required (ie greater than the depth or length of the core drill guide apparatus 1, then continue core drilling to a maximum depth having the inner end stop surface 64 of core drill apparatus 36 abut the driving end surface 27 of anchor bolt 25 for holding the core drill guide apparatus in place—see FIG. 14;
2. Then remove the core drill apparatus 36 from the second hole 70 and over the cylindrical elongate body of the core drill guide apparatus 1;
3. Then remove the anchor bolt 25 by unscrewing manually or mechanically leaving the anchor stud 28 in the first hole 38 of diameter 40;
4. Next if required, finish drilling around the anchor stud 28, by re-using the core drill apparatus 36 by placing it in the cored hole (core 11 still in place) and continue drilling to a desired depth;
5. Finally remove the core drill apparatus 36 and re-screw in the anchor bolt 25 into the anchor stud 28 and using the anchor bolt 25 to pull out both the anchor bolt 25 and anchor stud 28 with the cored substrate material 11, leaving an empty cored second hole 70 see FIG. 15;
6. Alternatively as shown in FIG. 15A, after finishing drilling, one can leave the core drill guide apparatus 1 in place and then reattach the anchor bolt 25 and remove ie lift out the core 11 with the core drill guide apparatus 1 attached.

The length or depth and orientation of the second hole 70 will determine what length of the core drill apparatus 36, core drill guide apparatus 1 and first hole 38 will be required. Additionally the diameter of the core drilled second hole 70 will also determine the size and length of the anchor bolt 25 and anchor stud 28 and core drill apparatus 36 and core drill guide apparatus 1. The drilled core substrate material 11 is clamped to the anchor stud 28 so making it very easy to pull out the drilled core substrate material 11 of the second hole 70 using the anchor bolt 25 with anchor stud 28.

Optional Advantages a) Simple to use
b) Single person operation
c) Quicker operation
d) Simple construction
e) Able to guide a core drill
f) Safer to use for core drilling
g) Modest cost to manufacture
h) Improved accuracy of core drilling i) Less chance of entanglement by user
j) Can be used on any surface of any angle
k) Core drill guide apparatus can be any shape
l) Can optionally use an insert member or not
m) Better able to retrieve drilled core after core drilling
n) Consistent angle of drilling better able to be achieved
o) Drill core is clamped to the anchor so enabling easy retrieval
p) No need to patch unwanted holes from supporting machinery
q) No need for complicated machinery to support the core drill
r) Insert member can be integrally formed or formed from components
s) No need to use feet to hold any separate parts of the core drill in place
t) Core drill guide apparatus is able to be clamped to a surrounding surface about a first hole Variations Throughout the description of this specification, the word "comprise" and variations of that word such as "comprising" and "comprises", are not intended to exclude other additives, components, integers or steps.

It will also be understood that where a product, method or process as herein described or claimed and that is sold incomplete, as individual components, or as a "kit of Parts", that such exploitation will fall within the ambit of the invention.

The core drill guide apparatus 1 is shown shaped as a block having a substantially polygonal eg square cross section but equally other cross sections are possible such as for example rectangular, hexagonal and non-polygonal eg circular etc as seen in FIGS. 16-23. The core drill guide apparatus 1 can be fabricated from one material or a combination of materials such as for example the materials can include plastics, timber or metal.

Figure 27:
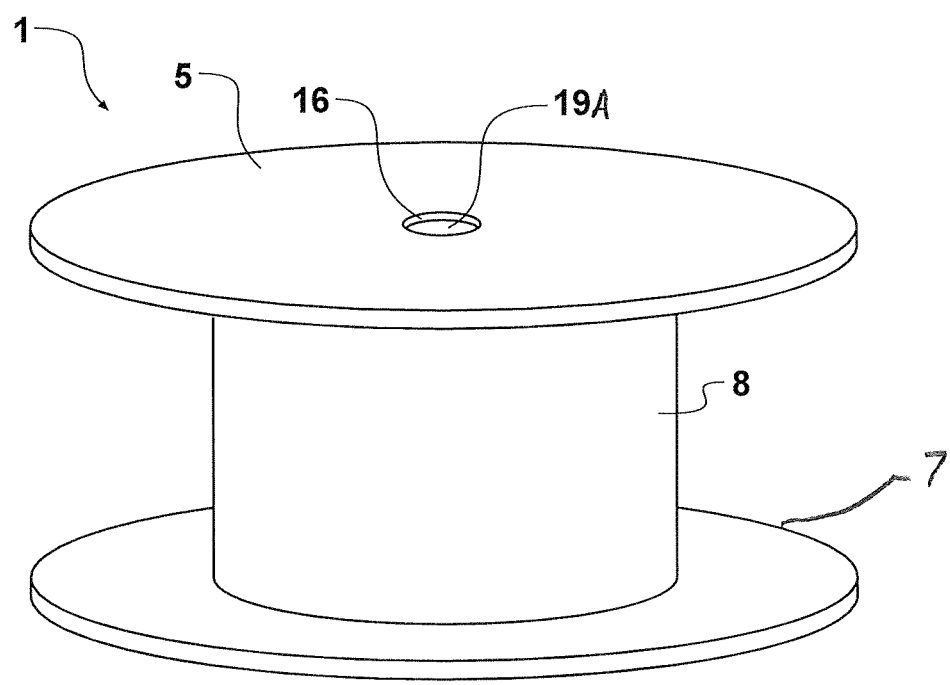

The structure of the body can be entirely solid, hollow having apertures or slots, be made of portions or layers or be framed. Therefore in yet another options as shown in FIG. 27, the elongate body of the guide 1 can be shaped with outer surface 3 including a portion of the sides walls 8 being recessed like for example as an "I" beam in cross section eg like an empty cable reel, having a narrow tubular portion separated by the entrance end 5 and exit end 7 (eg end plates) with the inner passageway 19A extending through the middle of the entrance end 5, through the narrow tubular portion and exit end 7. The extent and shape of the recess and ends 5, 7 can be varied to be similar in area or be different. The recess can be angled curved or have intermediate protruding portions like for example a frame, lattice structure, skeleton, tabs or bands, with side walls similar in extent to the side walls of the ends 5 and/or end 7.

If the shape of the elongate body has a suitable shape having corners, as some of the shapes will not have corners, then the corners 9 can also be chamfered or rounded.

The elongate insert member 15 is shown as being centrally located even though other positions of elongate insert member 15 are also possible. The elongate insert member 15 can be formed of any shape such as cylindrical, tubular of any cross sections such as for example circular or square. Notches 22 can be formed of any shape extent or spacing such as being formed as discrete recess or a continuous recess.

As shown in the FIGS. 25A-25C and 26A, 26B there is one option where the core drill guide apparatus 1 does not have the elongate insert member 15 but simply relies on the inner passageway 19A to provide access there through for the fastening system eg anchor bolt 25.

The fastener or fastening system includes for example anchor bolt 25 and anchor stud 28 can be of any number size spacing and shape and material type as long as they can function to fasten the cored drill guide apparatus 1 to the material to be drilled into and cored and yet also allow easy removal of the drilled core allowing options of removing and reinserting the fastening system with or without the core drill guide apparatus 1 with the core 11. Other examples of fasteners include any fastening that allow removal of the fastener or not but at least enable the drilled core (without or with the core drill guide apparatus 1) to be removed, which include tension bolts, wedges or screws with or without a suitable adhesive. Other components suitable for being part of the fastening system can include washers or nuts or tensioning means.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

In another option the hollow passageway 19 can be provided without an elongate insert member 15 and can be formed as a passageway 19 within the elongate body itself ie no separate insert member 15 is required in this option. However in yet another option, there can be a separate end cap portion 18 located at the entrance end if required. In other options the drill core guide apparatus 1 can include one end cap portion 18 also located at the exit end and or there can be an inner or outer side frame connecting the end cap portions 18.

Elongate insert member 15 can be formed as a one piece item or of more than one component connected, joined, clipped or abutted together ie items 16 and 18. The at least one end cap portion 18 is fitted to one end of the cylindrical body portion 16 by press fitting into a suitable shaped recess or simply being pressed in to end 5 to form a flush mounting on end 5. In another option, end cap portion 18 can be formed as part of cylindrical body portion 16 with the elongate body formed around one or each end cap portion 18 and cylindrical body portion 16. In yet another option, there may end cap portions 18 located at, at least both ends 5, 7. Furthermore end cap portions 18 can be formed to completely form an end cover of the entire exposed end area of each or end 5, 7 like as seen in FIG. 27—which such a figure can show end cap portion 18 forming the whole of the end 5, 7 or equally it shows there being no separate end cap portion 18 leaving just the ends 5, 7 with or without a separate cylindrical body portion 16.

The corners 9 and/or sides 8 (eg the sides 8 of the ends 5, 7 and rest of the body in between) of the elongate body of the core drill guide apparatus 1 are shaped as curved or angled to allow the core drill to slide there past which can abut somewhat or not as long as the core drill is guided and able to move past. The fastening system uses a bolt 25 and anchor 28, though other forms of fixing separately or in combination can also be used to clamp or hold the drill guide 1 to the outside of the first hole 38 via an inside of the first hole 28 eg an expanding anchor or toggle arrangement etc.

A lubricant or other means (eg slidable materials(s)) of assisting in the sliding of the core drill over the outside of core drill guide apparatus 1 can be used if desired. In yet other options the core drill may not need to slide directly against the outer surface 3 of the core drill guide body but can be spaced therefrom if necessary either by discrete sleeves, spacers or be spaced by eye. Any depth of drilling is also possible which can be similar to the height of the elongate body or be less or be greater than.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

For purposes of the description hereinafter, the terms "upper", "lower", "right", "left", "vertical", "horizontal", "top", "bottom", "lateral", "longitudinal", "side", "front", "rear" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

The core drill apparatus 36 can be any core drill as known in the art which usually includes a rotatable sleeve able to drill a core which is hollow and able to leave a space there between for sliding past and guide over the elongate body of the core drill guide apparatus 1.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What we claim is:

1. A core drill guide apparatus for providing a guide for a core drill apparatus to drill into a substrate so as to produce a removable core, the core drill guide apparatus comprising:
   an elongate body, which includes an outer surface and an inner space delimited by an entrance end, an exit end, and side walls, a distance between the entrance and exit ends defining a length of the elongate body, and a width of the elongate body is defined as a distance at right angles to the length between the side walls,
   wherein at least one inner passageway in the elongate body extends from the entrance end to the exit end, said inner passageway adapted to provide sliding receipt of a fastening system therethrough to clamp the core drill guide apparatus to a substrate surface surrounding a first hole in a substrate so as to then allow a core drill apparatus to abut thereon to the substrate surface and drill out the removable core in the substrate underneath and surrounding the first hole, and
   wherein the elongate body is formed of a polygonal shape having corners shaped as arcs that form part of an imaginary circle peripherally joining all the corners.

2. The core drill guide apparatus as claimed in claim 1, wherein an elongate insert member is located in the inner passageway of the elongate body which extends substantially from the entrance end to the exit end of the elongate body,
   wherein the fastening system includes an anchor bolt and an anchor stud, and
   wherein the elongate insert member includes a cylindrical body portion and at least one end cap portion, and the cylindrical body portion provides a hollow passageway of a diameter such that the end cap portion provides abutting strength for a head of the fastening system to clamp thereagainst and a body of the anchor bolt of the fastening system to be slidably located in the hollow passageway.

3. The core drill guide apparatus as claimed in claim 2, wherein the elongate insert member is formed of a metal which is friction fitted to the hollow passageway of the elongate body of the core drill guide apparatus.

4. The core drill guide apparatus as claimed in claim 2, wherein the elongate insert member is centrally located in the elongate body of the core drill guide apparatus.

5. The core drill guide apparatus as claimed in claim 1, wherein the side walls between the entrance end and the exit end are planar thereby providing a continuous surface in a 'block shape' shape.

6. The core drill guide apparatus as claimed in claim 1, wherein, the elongate body of the core drill guide apparatus is formed of substantially plastic material.

7. The core drill guide apparatus as claimed in claim 1, wherein at least a portion of the exit end of the elongate body including a notch stepped inwardly from a remainder of the outer surface so as to facilitate drilling therearound by the core drill apparatus without interfering with the elongate body.

8. The core drill guide apparatus as claimed in claim 1, wherein each one of the corners include a notch that steps inwardly with respect to the outer surface.

9. The core drill guide apparatus as claimed in claim 1, wherein the outer surface is configured to provide a lateral guide to the core drill apparatus, and the ends are configured to provide an end or vertical guide to the core drill apparatus.

* * * * *